United States Patent
Du et al.

(10) Patent No.: US 10,642,101 B2
(45) Date of Patent: May 5, 2020

(54) BACKLIGHT MODULE AND DOUBLE-SIDED LIQUID CRYSTAL DISPLAY DEVICE

(71) Applicant: BOE TECHNOLOGY GROUP CO., LTD., Beijing (CN)

(72) Inventors: Zhihong Du, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/985,418

(22) Filed: May 21, 2018

(65) Prior Publication Data
US 2019/0064598 A1 Feb. 28, 2019

(30) Foreign Application Priority Data
Aug. 28, 2017 (CN) .......................... 2017 1 0752508

(51) Int. Cl.
G02F 1/1333 (2006.01)
G02F 1/13357 (2006.01)
(Continued)

(52) U.S. Cl.
CPC ...... *G02F 1/133611* (2013.01); *G02B 6/0016* (2013.01); *G02B 6/0025* (2013.01);
(Continued)

(58) Field of Classification Search
CPC ......... G02F 1/133528; G02F 1/133504; G02F 1/133611; G02F 2001/133342;
(Continued)

(56) References Cited

U.S. PATENT DOCUMENTS

2003/0090606 A1   5/2003   Lee et al.
2005/0041179 A1*  2/2005   Suzuki .............. G02F 1/133536
                                                              349/74
(Continued)

FOREIGN PATENT DOCUMENTS

CN   1419154    5/2003
CN   1828386    9/2006
(Continued)

OTHER PUBLICATIONS

"First office action," CN Application No. 201710752508.0 (dated Sep. 17, 2019).

*Primary Examiner* — Michael H Caley
*Assistant Examiner* — Mariam Qureshi
(74) *Attorney, Agent, or Firm* — Womble Bond Dickinson (US) LLP

(57) ABSTRACT

The present disclosure provides a backlight module and a double-sided liquid crystal display device. The light utilization efficiency of the backlight module is improved. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film.

16 Claims, 4 Drawing Sheets

(51) Int. Cl.
*F21V 8/00* (2006.01)
*G02F 1/1335* (2006.01)

(52) U.S. Cl.
CPC ......... *G02B 6/0038* (2013.01); *G02B 6/0056* (2013.01); *G02B 6/0063* (2013.01); *G02F 1/133504* (2013.01); *G02F 1/133528* (2013.01); *G02B 6/0061* (2013.01); *G02F 1/133615* (2013.01); *G02F 2001/133342* (2013.01)

(58) Field of Classification Search
CPC .. G02B 6/0016; G02B 6/0056; G02B 6/0063; G02B 6/0038
See application file for complete search history.

(56) References Cited

U.S. PATENT DOCUMENTS

| | | | |
|---|---|---|---|
| 2005/0195344 A1* | 9/2005 | Chang ................ | H04M 1/0214 349/114 |
| 2008/0074899 A1* | 3/2008 | Wang .................. | G02B 6/0035 362/600 |
| 2009/0316433 A1* | 12/2009 | Shim ................... | G02B 6/0038 362/613 |
| 2018/0107064 A1 | 4/2018 | Bai | |

FOREIGN PATENT DOCUMENTS

| | | |
|---|---|---|
| CN | 105700233 | 6/2016 |
| JP | 2004127622 | 4/2004 |

\* cited by examiner

BACKLIGHT MODULE AND DOUBLE-SIDED LIQUID CRYSTAL DISPLAY DEVICE

RELATED APPLICATIONS

The present application claims the benefit of Chinese Patent Application No. 201710752508.0, filed on Aug. 28, 2017, the entire disclosures of which are incorporated herein by reference.

TECHNICAL FIELD

The present disclosure relates to the field of display technology, and particularly to a backlight module and a double-sided liquid crystal display device.

BACKGROUND

In order to satisfy the screen display requirements of face-to-face confirmation for two or more parties, the use of double-sided liquid crystal display devices in banks, supermarkets and other trading venues has become a trend. In the structure of a common double-sided liquid crystal display device, two liquid crystal panels opposite to each other share a backlight module, the backlight module includes a light emitting component. The light emitting component includes two light exit surfaces disposed opposite to each other. The natural light emitted by the light emitting component exits from a light exit surface and passes through the polarizer to become polarized light required by a liquid crystal panel, so as to supply light to the liquid crystal panel. Likewise, light emitted from another light exit surface provides light to another liquid crystal panel, thereby achieving double-sided display.

SUMMARY

The embodiments of the present disclosure provide a backlight module and a double-sided liquid crystal display device. The light utilization efficiency of the backlight module is improved.

An embodiment of the present disclosure provides a backlight module. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film.

Optionally, each liquid crystal brightness enhancement film includes two diaphragms disposed opposite to each other and a cholesteric liquid crystal layer sandwiched between the two diaphragms.

Optionally, the light emitting component includes: a light guide plate and a light source; the light guide plate includes two light exit surfaces serving as the first light exit surface and the second light exit surface, respectively, and a lateral surface connecting the two light exit surfaces; the lateral surface includes at least a light incident surface; a light emitting surface of the light source faces the light incident surface of the light guide plate.

Optionally, a plurality of grooves with a longitudinal section of triangular shape are disposed on each light exit surface, and the plurality of grooves on the first light exit surface are interlaced with the plurality of grooves on the second light exit surface; the plurality of grooves on the first light exit surface are arranged to redirect light emitted by the light source to the second light exit surface, and the plurality of grooves on the second light exit surface are arranged to redirect light emitted by the light source to the first light exit surface.

The plurality of grooves with a longitudinal section of triangular shape are disposed on each light exit surface, and the plurality of grooves on the first light exit surface are interlaced with the plurality of grooves on the second light exit surface. In this way, light emitted by the light source is reflected to the opposite light exit surface and exits, which can reduce the loss due to the light reflection within the light guide plate, and the light utilization efficiency of the backlight module can thus be improved.

Optionally, an angle between a reflective surface of the groove and the light exit surface provided with the groove increases in a direction away from the light source that emits light to the reflective surface of the groove.

The angle between a reflective surface of the groove and the light exit surface provided with the groove increases in a direction away from the light source that emits light to the reflective surface of the groove. Therefore, the outgoing light can be perpendicular to the light exit surface as much as possible. The reflection loss is thus reduced, thereby improving the light utilization efficiency.

Optionally, the angle α between the reflective surface of the groove and the light exit surface provided with the groove satisfies: α=(90−A)/2; A represents an angle between light incident on the reflective surface and a plane where the light exit surface is located.

Since the angle α between the reflective surface of the groove and the light exit surface provided with the groove satisfies: α=(90−A)/2, the outgoing light can be substantially perpendicular to the light exit surface. The reflection loss is thus reduced, thereby improving the light utilization efficiency.

Optionally, the light emitting component includes: a first diffusion plate and a second diffusion plate disposed opposite to each other, and a light source located between the first diffusion plate and the second diffusion plate; a light exit surface of the first diffusion plate serves as the first light exit surface of the light emitting component, and a light exit surface of the second diffusion plate serves as the second light exit surface of the light emitting component.

Optionally, the light source includes a transparent circuit board; the transparent circuit board includes a first surface and a second surface disposed opposite to each other; the first surface and the second surface are provided with a plurality of light emitting devices respectively.

Optionally, the light emitting devices on the first surface are disposed symmetrical with the light emitting devices on the second surface.

Optionally, the light source includes a plurality of transparent support bars arranged at intervals and in parallel; each transparent support bar includes a first surface and a second surface disposed opposite to each other; the first surface and the second surface are provided with a plurality of light emitting devices respectively.

The light source includes a plurality of transparent support bars arranged at intervals and in parallel. This facilitates the transmission of the reflected light, so that the reflected light can be more effectively utilized by the liquid crystal display panel on the other side, thereby improving the light utilization efficiency of the backlight module.

An embodiment of the present disclosure also provides a double-sided liquid crystal display device. The double-sided liquid crystal display device includes: a first liquid crystal display panel and a second liquid crystal display panel arranged opposite to each other, and the backlight module according to any one of the above mentioned embodiments; the backlight module is arranged between the first liquid crystal display panel and the second liquid crystal display panel.

Optionally, the first liquid crystal display panel is disposed on a light exit side of the first quarter-wave plate, and a first polarizer is provided on a light incident side of the first liquid crystal display panel; a polarization direction of light emitted from the first quarter-wave plate is parallel to a direction of a transmission axis of the first polarizer.

By arranging the first polarizer, completely linearly polarized light can be provided for the first liquid crystal display panel, so as to avoid light leakage and other problems, so that the display effect of the first liquid crystal display panel can be improved.

Optionally, the second liquid crystal display panel is disposed on a light exit side of the second quarter-wave plate, and a second polarizer is provided on a light incident side of the second liquid crystal display panel; a polarization direction of light emitted from the second quarter-wave plate is parallel to a direction of a transmission axis of the second polarizer; the direction of the transmission axis of the first polarizer is perpendicular to a direction of a transmission axis of the second polarizer.

By arranging the second polarizer, completely linearly polarized light can be provided for the second liquid crystal display panel, so as to avoid light leakage and other problems, so that the display effect of the second liquid crystal display panel can be improved.

Optionally, each liquid crystal brightness enhancement film includes two diaphragms disposed opposite to each other and a cholesteric liquid crystal layer sandwiched between the two diaphragms.

Optionally, the light emitting component includes: a light guide plate and a light source; the light guide plate includes two light exit surfaces serving as the first light exit surface and the second light exit surface, respectively, and a lateral surface connecting the two light exit surfaces; the lateral surface includes at least a light incident surface; a light emitting surface of the light source faces the light incident surface of the light guide plate.

Optionally, a plurality of grooves with a longitudinal section of triangular shape are disposed on each light exit surface, and the plurality of grooves on the first light exit surface are interlaced with the plurality of grooves on the second light exit surface; the plurality of grooves on the first light exit surface are arranged to redirect light emitted by the light source to the second light exit surface, and the plurality of grooves on the second light exit surface are arranged to redirect light emitted by the light source to the first light exit surface.

The plurality of grooves with a longitudinal section of triangular shape are disposed on each light exit surface, and the plurality of grooves on the first light exit surface are interlaced with the plurality of grooves on the second light exit surface. In this way, light emitted by the light source is reflected to the opposite light exit surface and exits, which can reduce the loss due to the light reflection within the light guide plate, and the light utilization efficiency of the backlight module can thus be improved.

Optionally, an angle between a reflective surface of the groove and the light exit surface provided with the groove increases in a direction away from the light source that emits light to the reflective surface of the groove.

The angle between a reflective surface of the groove and the light exit surface provided with the groove increases in a direction away from the light source that emits light to the reflective surface of the groove. Therefore, the outgoing light can be perpendicular to the light exit surface as much as possible. The reflection loss is thus reduced, thereby improving the light utilization efficiency.

Optionally, the angle $\alpha$ between the reflective surface of the groove and the light exit surface provided with the groove satisfies: $\alpha=(90-A)/2$; A represents an angle between light incident on the reflective surface and a plane where the light exit surface is located.

Since the angle $\alpha$ between the reflective surface of the groove and the light exit surface provided with the groove satisfies: $\alpha=(90-A)/2$, the outgoing light can be substantially perpendicular to the light exit surface. The reflection loss is thus reduced, thereby improving the light utilization efficiency.

Optionally, the light emitting component includes: a first diffusion plate and a second diffusion plate disposed opposite to each other, and a light source located between the first diffusion plate and the second diffusion plate; a light exit surface of the first diffusion plate serves as the first light exit surface of the light emitting component, and a light exit surface of the second diffusion plate serves as the second light exit surface of the light emitting component.

Optionally, the light source includes a transparent circuit board; the transparent circuit board includes a first surface and a second surface disposed opposite to each other; the first surface and the second surface are provided with a plurality of light emitting devices respectively.

Optionally, the light emitting devices on the first surface are disposed symmetrical with the light emitting devices on the second surface.

Optionally, the light source includes a plurality of transparent support bars arranged at intervals and in parallel; each transparent support bar includes a first surface and a second surface disposed opposite to each other; the first surface and the second surface are provided with a plurality of light emitting devices respectively.

The light source includes a plurality of transparent support bars arranged at intervals and in parallel. This facilitates the transmission of the reflected light, so that the reflected light can be more effectively utilized by the liquid crystal display panel on the other side, thereby improving the light utilization efficiency of the backlight module.

DETAILED DESCRIPTION OF THE DISCLOSURE

Figure 1:
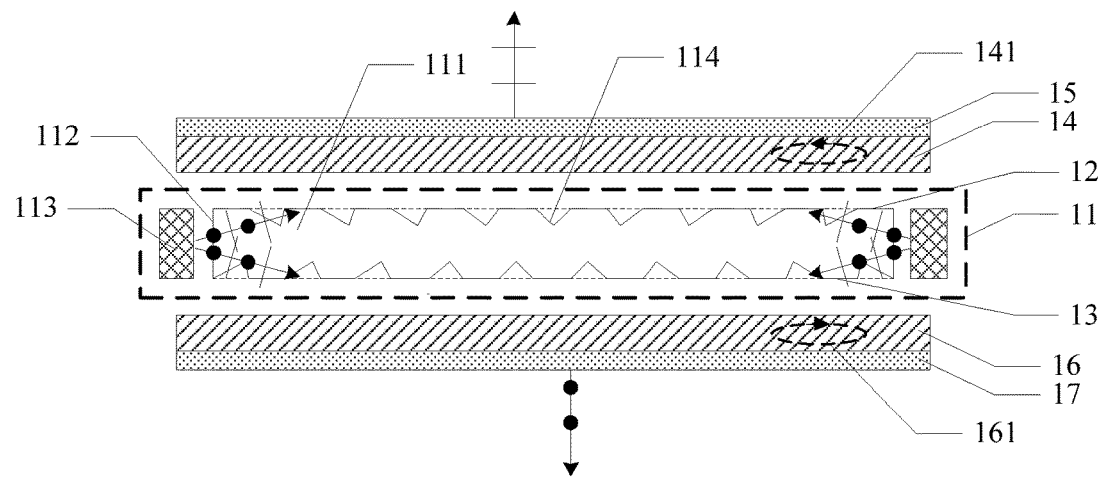
FIG. 1 is a structural schematic diagram of a backlight module provided by an embodiment of the present disclosure.

The embodiments of the present disclosure provide a backlight module and a double-sided liquid crystal display device. The light utilization efficiency of the backlight module is improved.

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

It should be noted that the thickness and shape of each layer in the drawings of the present disclosure do not reflect the true proportions and are only intended to schematically illustrate the disclosure.

The inventors have noticed that in the existing double-sided liquid crystal display device, when the natural light emitted from the light-emitting component passes through the polarizer, the linearly polarized light with a polarization direction perpendicular to the direction of the transmission axis of the polarizer is generally absorbed and lost, resulting in a poor light utilization for the backlight module.

According to an aspect of the present disclosure, a backlight module is provided. The backlight module can be used, for example, in a double-sided liquid crystal display device. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film.

In the context of the present disclosure, "the rotation structure of the first liquid crystal brightness enhancement film is opposite to the rotation structure of the second liquid crystal brightness enhancement film" refers to that the rotational structure of the first liquid crystal brightness enhancement film and the rotational structure of the second liquid crystal brightness enhancement film are spatially symmetrical with each other.

The working principle of the double-sided liquid crystal display device in the embodiments of the present disclosure will be briefly described below.

In the embodiment of the present disclosure, when the light emitted from the light emitting component reaches the first liquid crystal brightness enhancement film, the circularly polarized light having the same rotation direction as that of the first liquid crystal brightness enhancement film is reflected, and the circularly polarized light having a rotation direction opposite to that of the first liquid crystal brightness enhancement film passes through the first liquid crystal brightness enhancement film. The passed circularly polarized light passes through the first quarter-wave plate and becomes linearly polarized light, and is then used by the liquid crystal display panel located adjacent to the first quarter-wave plate. The rotation direction of the reflected circularly polarized light is just opposite to that of the second liquid crystal brightness enhancement film, so the reflected circularly polarized light can pass through the second liquid crystal brightness enhancement film and then be used by the liquid crystal display panel on the other side.

Similarly, when the light emitted from the light emitting component reaches the second liquid crystal brightness enhancement film, the circularly polarized light having the same rotation direction as that of the second liquid crystal brightness enhancement film is reflected, and the circularly polarized light having a rotation direction opposite to that of the second liquid crystal brightness enhancement film passes through the second liquid crystal brightness enhancement film. The passed circularly polarized light passes through the second quarter-wave plate and becomes linearly polarized light, and is then used by the liquid crystal display panel located adjacent to the second quarter-wave plate. The rotation direction of the reflected circularly polarized light is just opposite to that of the first liquid crystal brightness enhancement film, so the reflected circularly polarized light can pass through the first liquid crystal brightness enhancement film and then be used by the liquid crystal display panel on the other side.

The backlight module provided by the embodiments of the present disclosure can be used in a double-sided liquid crystal display device. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film. When the light emitted from the light emitting component reaches the first liquid crystal brightness enhancement film, the circularly polarized light having the same rotation direction as that of the first liquid crystal brightness enhancement film is reflected, and the circularly polarized light having a rotation direction opposite to that of the first liquid crystal brightness enhancement film passes through the first liquid crystal brightness enhancement film. The passed circularly polarized light passes through the first quarter-wave plate and becomes linearly polarized light, and is then used by the liquid crystal display panel located adjacent to the first quarter-wave plate. The rotation direction of the reflected circularly polarized light is just opposite to that of the second liquid crystal brightness enhancement film, so the reflected circularly polarized light can pass through the second liquid crystal brightness enhancement film and then be used by the liquid crystal display panel on the other side. Similarly, the same situation occurs when the light emitted by the light emitting component reaches the second liquid crystal brightness enhancement film, so the light utilization efficiency of the backlight module can be improved.

The backlight module of the double-sided liquid crystal display device provided by the embodiments of the present disclosure can be divided into a lateral entrance type and a direct type, and the following examples will be described respectively.

Referring to FIG. 1, a backlight module provided by an embodiment of the present disclosure can be used in a double-sided liquid crystal display device. The backlight module includes a light emitting component 11 (indicated with the dotted box in FIG. 1), the light emitting component 11 includes a first light exit surface 12 and a second light exit surface 13 disposed opposite to each other. A first liquid crystal brightness enhancement film 14 and a first quarter-wave plate 15 are sequentially disposed along a light emitting direction of the first light exit surface 12. A second liquid crystal brightness enhancement film 16 and a second quarter-wave plate 17 are sequentially disposed along a light emitting direction of the second light exit surface 13. A rotation structure 141 of the first liquid crystal brightness enhancement film 14 is opposite to a rotation structure 161 of the second liquid crystal brightness enhancement film 16.

Figure 8:
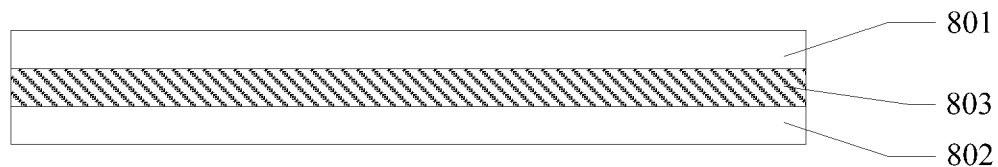
FIG. 8 is a structural schematic diagram of a liquid crystal brightness enhancement film according to an embodiment of the present disclosure.

The liquid crystal brightness enhancement film is configured such that the circularly polarized light having the same rotation direction as that of the first liquid crystal brightness enhancement film is reflected, and the circularly polarized light having the opposite rotation direction to that of the first liquid crystal brightness enhancement film can pass the first liquid crystal brightness enhancement film. As shown in FIG. 8, the structure of the liquid crystal brightness enhancement film 800 may include, for example, two opposed diaphragms 801, 802 and a cholesteric liquid crystal layer 803 sandwiched between the two diaphragms.

The rotational structures of the first liquid crystal brightness enhancement film 14 and the second liquid crystal brightness enhancement film 16 are opposite to each other. For example, the first liquid crystal brightness enhancement film 14 may have a left-handed structure, and the second liquid crystal brightness enhancement film 16 may have a right-handed structure. In this way, when the light emitted from the light-emitting module 11 reaches the first liquid crystal brightness enhancement film 14, left-handed circularly polarized light is reflected and right-handed circularly polarized light passes. The passed right circularly polarized light passes through the first quarter-wave plate 15 and becomes a first linearly polarized light. The rotation direction of the reflected left-handed circularly polarized light is exactly opposite to the rotation structure of the second liquid crystal lightening film 16, so the light ray can pass through the second liquid crystal brightening film 16, and then passes through the second quarter-wave plate 17 and becomes a second linearly polarized light. The polarization directions of the first linearly polarized light and the second linearly polarized light are perpendicular to each other. Similarly, when the light emitted from the light emitting component 11 reaches the second liquid crystal brightness enhancement film 16, the right-handed circularly polarized light is reflected and the left-handed circularly polarized light passes. The passed left-handed circularly polarized light passes through the second quarter-wave plate 17 and becomes the second linearly polarized light. The rotation direction of the reflected right-handed circularly polarized light is exactly opposite to the rotation structure of the first liquid crystal brightness enhancement film 14, so the light ray can pass through the first liquid crystal brightness enhancement film 14, and then passes through the first quarter-wave plate 15 and becomes the first linearly polarized light.

The light rays are indicated with arrows in the figures.

As shown in FIG. 1, the light emitting component 11 includes: a light guide plate 111 and a light source 113; the light guide plate 111 includes two light exit surfaces serving as the first light exit surface 12 and the second light exit surface 13, respectively, and a lateral surface connecting the two light exit surfaces; the lateral surface includes at least a light incident surface 112; a light emitting surface of the light source 113 faces the light incident surface 112 of the light guide plate 111. The light source 113 may be, for example, an LED light bar.

Of course, the light guide plate 111 may also include a light incident surface 112, and may also include a plurality of light incident surfaces 112. The number of the light incident surfaces is not limited in the embodiment of the present disclosure.

Dots with different densities may be arranged on the light exit surface of the light guide plate 111, so as to keep the emitted light uniform and improve the display effect.

In an alternative embodiment, as shown in FIG. 1, in order to reduce the loss of light continuously reflected inside the light guide plate and increase the light utilization efficiency of the backlight module, a plurality of grooves 114 with a longitudinal section of triangular shape are disposed on each light exit surface. The plurality of grooves 114 on the first light exit surface 12 are interlaced with the plurality of grooves 114 on the second light exit surface 13; the plurality of grooves 114 on the first light exit surface 12 are arranged to redirect light emitted by the light source 113 to the second light exit surface 13, and the plurality of grooves 114 on the second light exit surface 13 are arranged to redirect light emitted by the light source 113 to the first light exit surface 12.

In the context of the present disclosure, the "longitudinal section" of the groove refers to the cross-section taken in a direction perpendicular to the extension direction of the groove.

In an alternative embodiment, in order to make the outgoing light be perpendicular to the light exit surface as much as possible, reduce the reflection loss and improve the light utilization efficiency, an angle between a reflective surface of the groove 114 and the light exit surface provided with the groove increases in a direction away from the light source 113 that emits light to the reflective surface of the groove 114.

Figure 2A:
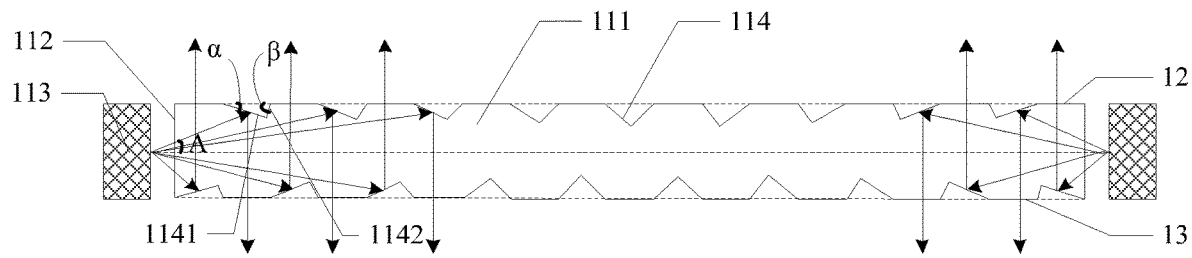
FIG. 2a is a structural schematic diagram of a light emitting component in a backlight module provided by an embodiment of the present disclosure.
Figure 2B:
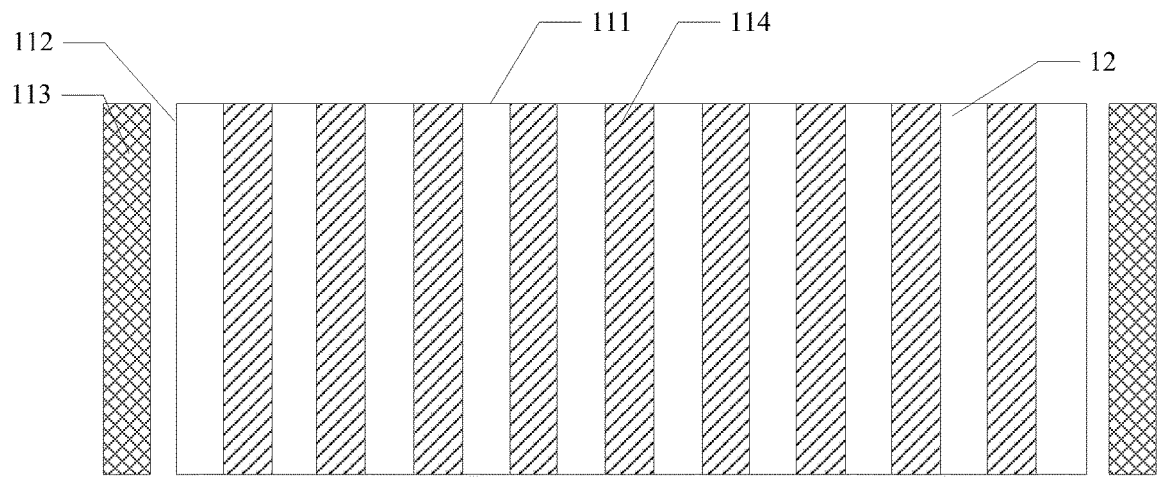
FIG. 2b is a top view of a light emitting component in a backlight module provided by an embodiment of the present disclosure.

For example, as shown in FIG. 2a, on the first light exit surface 12 of the light guide plate 111, the angle between the reflective surface 1141 on the left side of the groove 114 and the light exit surface provided with the groove 114 is α. α increases in the direction away from the left light source 113. The angle between the reflective surface 1142 on the right side of the groove 114 and the light exit surface provided with the groove 114 is β. β increases in the direction away from the right light source 113. That is, for the first light exit surface 12 of the light guide plate 111, α increases from left to right, and β decreases from left to right. FIG. 2b is a top view of a light emitting component in a backlight module provided by an embodiment of the present disclosure.

In an alternative embodiment, in order to make the outgoing light substantially perpendicular to the light exit surface, reduce the reflection loss and improve the light utilization efficiency, the angle α between the reflective surface of the groove and the light exit surface provided with the groove satisfies the following condition: α=(90−A)/2 (1); A represents an angle between light incident on the reflective surface and a plane where the light exit surface is located. That is, the above angles α and β satisfy the condition (1).

As shown in FIG. 2a, the above angle A represents the angle between a light ray and the plane parallel to the light exit surface of the light guide plate 111; the light ray is emitted from the center of the left light source 113 and reaches the reflective surface 1141 on the left side of the groove 114.

The backlight module provided by another embodiment of the present disclosure is similar to the backlight module provided by the above embodiments, and the same parts are not described herein again. Only the different parts will be described below.

Figure 3:
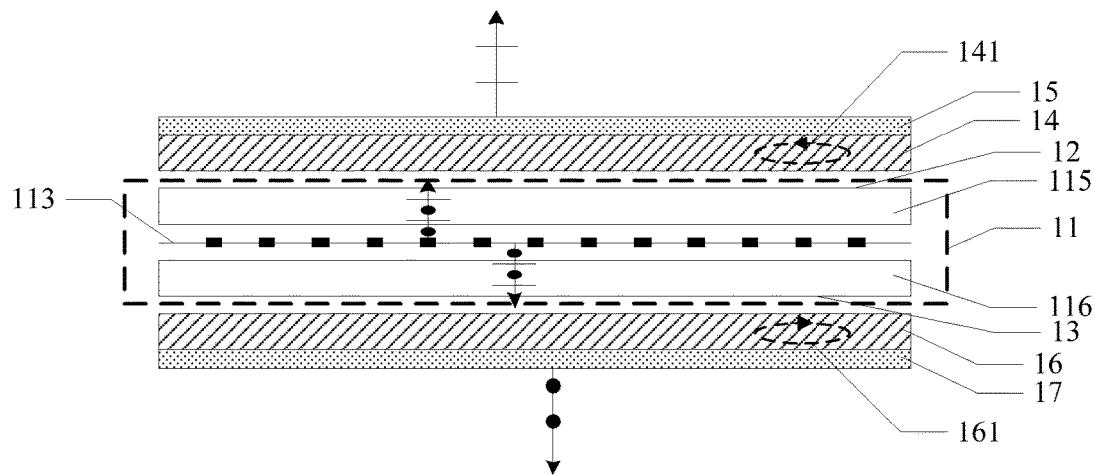
FIG. 3 is a structural schematic diagram of a backlight module provided by another embodiment of the present disclosure.

Referring to FIG. 3, in the backlight module, the light emitting component 11 includes: a first diffusion plate 115 and a second diffusion plate 116 disposed opposite to each other, and a light source 113 located between the first diffusion plate 115 and the second diffusion plate 116; a light exit surface of the first diffusion plate 115 serves as the first light exit surface 12 of the light emitting component 11, and a light exit surface of the second diffusion plate 116 serves as the second light exit surface 13 of the light emitting component 11.

Figure 4:
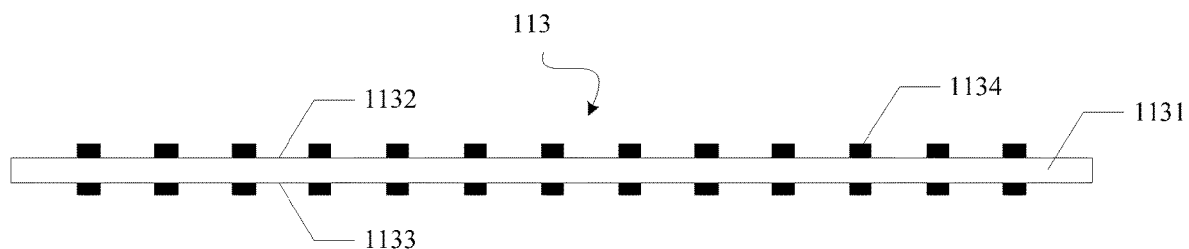
FIG. 4 is a cross-sectional view of a light source in a backlight module provided by another embodiment of the present disclosure.

In an alternative embodiment, as shown in FIG. 4, the light source 113 includes a transparent circuit board 1131; the transparent circuit board 1131 includes a first surface 1132 and a second surface 1133 disposed opposite to each other; the first surface 1132 and the second surface 1133 are provided with a plurality of light emitting devices 1134 respectively.

The light emitting device 1134 may be, for example, a light emitting diode (LED), a cold cathode fluorescent lamp (CCFL), an organic light emitting diode (OLED), or the like.

In an alternative embodiment, as shown in FIG. 4, the light emitting devices 1134 on the first surface 1132 are disposed symmetrical with the light emitting devices 1134 on the second surface 1133. Of course, the light emitting devices 1134 on the first surface 1132 and the light emitting devices 1134 on the second surface 1133 may also be asymmetrically disposed, which is not limited in the embodiments of the disclosure.

Figure 5:
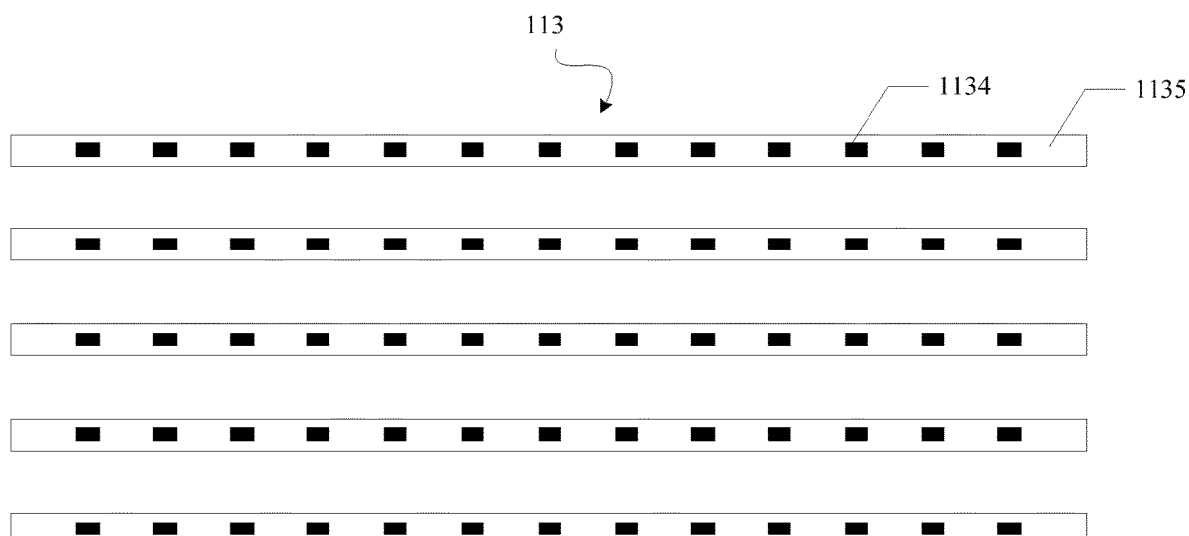
FIG. 5 is a top view of a light source in a backlight module provided by another embodiment of the present disclosure.

In an alternative embodiment, as shown in FIG. 5, the light source 113 includes a plurality of transparent support bars 1135 arranged at intervals and in parallel; each transparent support bar 1135 includes a first surface and a second surface disposed opposite to each other; the first surface and the second surface are provided with a plurality of light emitting devices 1134 respectively. With the above arrangement, the reflected light can pass through the transparent support bars, so that the reflected light can be more effectively utilized by the liquid crystal display panel on the other side, and the light utilization efficiency of the backlight module can be improved.

Figure 6:
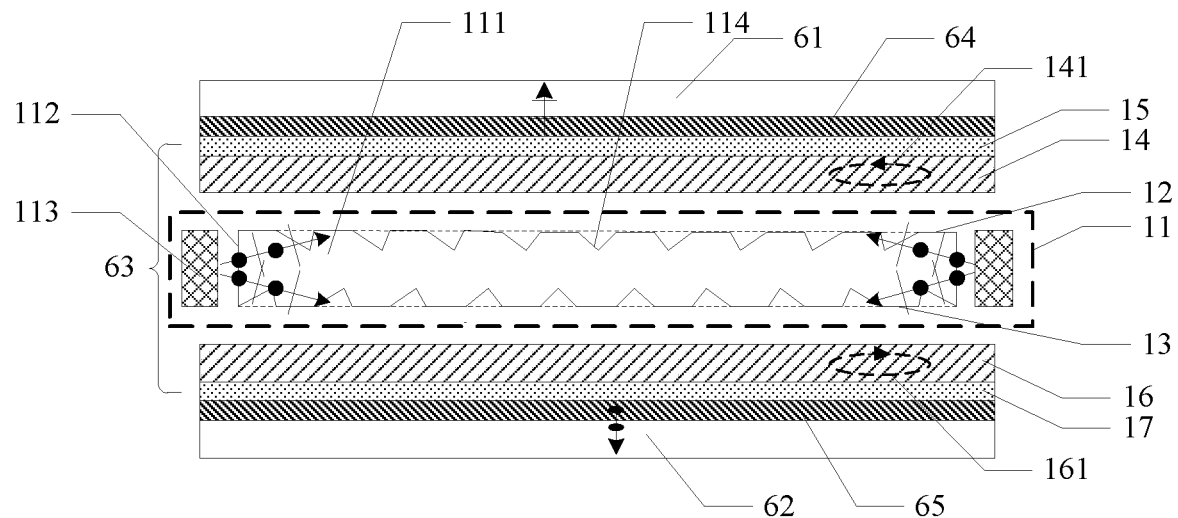
FIG. 6 is a structural schematic diagram of a double-sided liquid crystal display device provided by an embodiment of the present disclosure.
Figure 7:
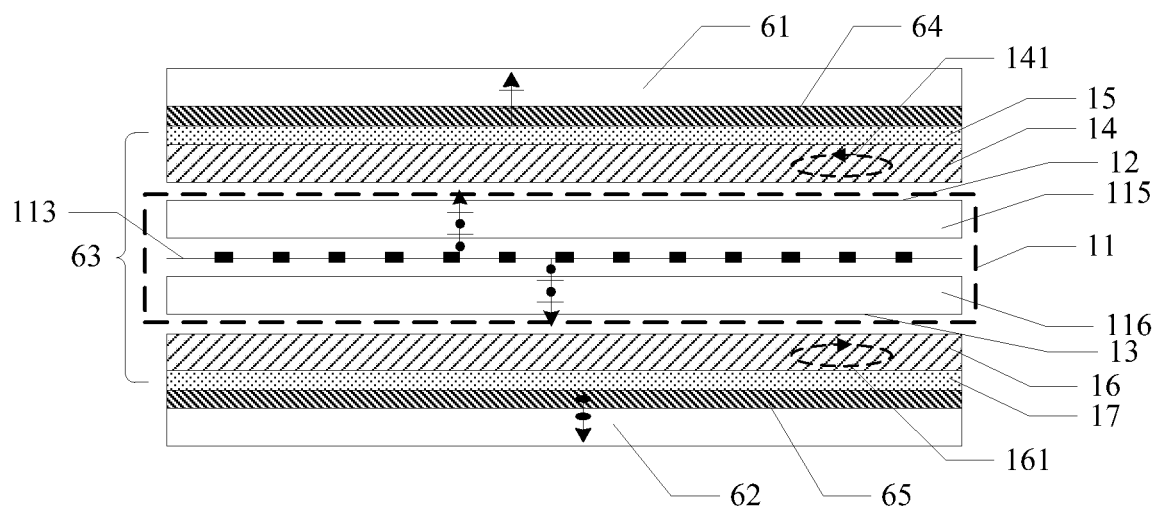
FIG. 7 is a structural schematic diagram of a double-sided liquid crystal display device provided by another embodiment of the present disclosure.

Based on the same concept, referring to FIG. 6 and FIG. 7, the embodiment of the present disclosure also provides a double-sided liquid crystal display device. The double-sided liquid crystal display device includes: a first liquid crystal display panel 61 and a second liquid crystal display panel 62 arranged opposite to each other, and the backlight module 63 according to any one of the above mentioned embodiments; the backlight module 63 is arranged between the first liquid crystal display panel 61 and the second liquid crystal display panel 62.

The double-sided liquid crystal display device provided by the embodiments of the present disclosure applies the above-mentioned backlight module. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film. When the light emitted from the light emitting component reaches the first liquid crystal brightness enhancement film, the circularly polarized light having the same rotation direction as that of the first liquid crystal brightness enhancement film is reflected, and the circularly polarized light having a rotation direction opposite to that of the first liquid crystal brightness enhancement film passes through the first liquid crystal brightness enhancement film. The passed circularly polarized light passes through the first quarter-wave plate and becomes linearly polarized light, and is then used by the liquid crystal display panel located adjacent to the first quarter-wave plate. The rotation direction of the reflected circularly polarized light is just opposite to that of the second liquid crystal brightness enhancement film, so the reflected circularly polarized light can pass through the second liquid crystal brightness enhancement film and then be used by the liquid crystal display panel on the other side. Similarly, the same situation occurs when the light emitted by the light emitting component reaches the second liquid crystal brightness enhancement film, so the light utilization efficiency of the backlight module can be improved.

In an alternative embodiment, as shown in FIG. 6 and FIG. 7, the first liquid crystal display panel 61 is disposed on a light exit side of the first quarter-wave plate 15 in the backlight module 63, and a first polarizer 64 is provided on a light incident side of the first liquid crystal display panel 61 (i.e., between the first quarter-wave plate 15 and the first liquid crystal display panel 61); a polarization direction of light emitted from the first quarter-wave plate 15 in the backlight module 63 is parallel to a direction of a transmission axis of the first polarizer 64.

In an alternative embodiment, as shown in FIG. 6 and FIG. 7, the second liquid crystal display panel 62 is disposed on a light exit side of the second quarter-wave plate 17 in the backlight module 63, and a second polarizer 64 is provided on a light incident side of the second liquid crystal display panel 62 (i.e., between the second quarter-wave plate 17 and the second liquid crystal display panel 62); a polarization direction of light emitted from the second quarter-wave plate 17 in the backlight module 63 is parallel to a direction of a transmission axis of the second polarizer 65.

The direction of the transmission axis of the first polarizer 64 is perpendicular to a direction of a transmission axis of the second polarizer 65.

It should be noted that in the embodiment of the present disclosure, the first light exit surface 12 of the backlight module 63 may provide light to the first liquid crystal display panel 61, and the second light exit surface 13 of the backlight module 63 may provide light to the second liquid crystal display 62. Alternatively, the first light exit surface 12 of the backlight module 63 may provide light to the second liquid crystal display panel 62, and the second light exit surface 13 of the backlight module 63 may provide light to the first liquid crystal display panel 61, which is not limited in the embodiments of the present disclosure.

In summary, the backlight module provided by the embodiment of the present disclosure can be used in a double-sided liquid crystal display device. The backlight module includes a light emitting component, the light emitting component includes a first light exit surface and a second light exit surface disposed opposite to each other. A first liquid crystal brightness enhancement film and a first quarter-wave plate are sequentially disposed along a light emitting direction of the first light exit surface. A second liquid crystal brightness enhancement film and a second quarter-wave plate are sequentially disposed along a light emitting direction of the second light exit surface. A rotation structure of the first liquid crystal brightness enhancement film is opposite to a rotation structure of the second liquid crystal brightness enhancement film. When the light emitted from the light emitting component reaches the first liquid crystal brightness enhancement film, the circularly polarized light having the same rotation direction as that of the first liquid crystal brightness enhancement film is reflected, and the circularly polarized light having a rotation direction opposite to that of the first liquid crystal brightness enhancement film passes through the first liquid crystal brightness enhancement film. The passed circularly polarized light passes through the first quarter-wave plate and becomes linearly polarized light, and is then used by the liquid crystal display panel located adjacent to the first quarter-wave plate. The rotation direction of the reflected circularly polarized light is just opposite to that of the second liquid crystal brightness enhancement film, so the reflected circularly polarized light can pass through the second liquid crystal brightness enhancement film and then be used by the liquid crystal display panel on the other side. Similarly, the same situation occurs when the light emitted by the light emitting component reaches the second liquid crystal brightness enhancement film, so the light utilization efficiency of the backlight module can be improved.

Apparently, the person skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

What is claimed is:

1. A backlight module, comprising:
a light emitting component comprising a first light exit surface and a second light exit surface disposed opposite to each other; a first liquid crystal brightness enhancement film and a first quarter-wave plate sequentially disposed along a light emitting direction of the first light exit surface; a second liquid crystal brightness enhancement film and a second quarter-wave plate sequentially disposed along a light emitting direction of the second light exit surface;
wherein a rotation structure of the first liquid crystal brightness enhancement film is opposite to a rotation structure of the second liquid crystal brightness enhancement film;
wherein the light emitting component comprises: a light guide plate and a light source; the light guide plate comprises two light exit surfaces serving as the first light exit surface and the second light exit surface, respectively, and a lateral surface connecting the two light exit surfaces; the lateral surface comprises at least a light incident surface; a light emitting surface of the light source faces the light incident surface of the light guide plate;
wherein a plurality of facets and a plurality of grooves with a longitudinal section of triangular shape are disposed on each light exit surface; each facet is parallel to a light exit surface on which the facet is located and disposed between two adjacent grooves; the plurality of grooves on the first light exit surface are interlaced with the plurality of grooves on the second light exit surface; each facet located on the first light exit surface corresponds to a groove located on the second light exit surface, and each facet located on the second light exit surface corresponds to a groove located on the first light exit surface; each groove on the first light exit surface is arranged to redirect light emitted by the light source to a corresponding facet located on the second light exit surface, and each groove on the second light exit surface is arranged to redirect light emitted by the light source to a corresponding facet located on the first light exit surface.

2. The backlight module according to claim 1, wherein each liquid crystal brightness enhancement film comprises two diaphragms disposed opposite to each other and a cholesteric liquid crystal layer sandwiched between the two diaphragms.

3. The backlight module according to claim 1, wherein an angle α is formed between a reflective surface of each of the plurality of grooves and a light exit surface provided with the groove, and the angle α increases in a direction away from the light source that emits light to the reflective surface of the groove.

4. The backlight module according to claim 3, wherein the angle α between the reflective surface of the groove and the light exit surface provided with the groove satisfies:

$$\alpha=(90-A)/2$$

wherein A represents an angle between light incident on the reflective surface and a plane where the light exit surface is located.

5. The backlight module according to claim 1, wherein the light emitting component comprises: a first diffusion plate and a second diffusion plate disposed opposite to each other, and a light source located between the first diffusion plate and the second diffusion plate; a light exit surface of the first diffusion plate serves as the first light exit surface of the light emitting component, and a light exit surface of the second diffusion plate serves as the second light exit surface of the light emitting component.

6. The backlight module according to claim 5, wherein the light source comprises a transparent circuit board; the transparent circuit board comprises a first surface and a second surface disposed opposite to each other; the first surface and the second surface are provided with a plurality of light emitting devices respectively.

7. The backlight module according to claim 6, wherein the light emitting devices on the first surface are disposed symmetrical with the light emitting devices on the second surface.

8. The backlight module according to claim 5, wherein the light source comprises a plurality of transparent support bars arranged at intervals and in parallel; each transparent support bar comprises a first surface and a second surface disposed opposite to each other; the first surface and the second surface are provided with a plurality of light emitting devices respectively.

9. A double-sided liquid crystal display device, comprising: a first liquid crystal display panel and a second liquid crystal display panel arranged opposite to each other, and the backlight module according to claim 1; wherein the backlight module is arranged between the first liquid crystal display panel and the second liquid crystal display panel.

10. The double-sided liquid crystal display device according to claim 9, wherein the first liquid crystal display panel is disposed on a light exit side of the first quarter-wave plate, and a first polarizer is provided on a light incident side of the first liquid crystal display panel; a polarization direction of light emitted from the first quarter-wave plate is parallel to a direction of a transmission axis of the first polarizer.

11. The double-sided liquid crystal display device according to claim 10, wherein the second liquid crystal display panel is disposed on a light exit side of the second quarter-wave plate, and a second polarizer is provided on a light incident side of the second liquid crystal display panel; a polarization direction of light emitted from the second quarter-wave plate is parallel to a direction of a transmission axis of the second polarizer; the direction of the transmission axis of the first polarizer is perpendicular to a direction of a transmission axis of the second polarizer.

12. The double-sided liquid crystal display device according to claim 9, wherein each liquid crystal brightness enhancement film comprises two diaphragms disposed opposite to each other and a cholesteric liquid crystal layer sandwiched between the two diaphragms.

13. The double-sided liquid crystal display device according to claim 9, wherein an angle α is formed between a reflective surface of each of the plurality of grooves and a light exit surface provided with the groove, and the angle α increases in a direction away from the light source that emits light to the reflective surface of the groove.

14. The double-sided liquid crystal display device according to claim 13, wherein the angle α between the reflective surface of the groove and the light exit surface provided with the groove satisfies:

$$a=(90-A)/2$$

wherein A represents an angle between light incident on the reflective surface and a plane where the light exit surface is located.

15. The double-sided liquid crystal display device according to claim 9, wherein the light emitting component comprises: a first diffusion plate and a second diffusion plate disposed opposite to each other, and a light source located between the first diffusion plate and the second diffusion plate; a light exit surface of the first diffusion plate serves as the first light exit surface of the light emitting component, and a light exit surface of the second diffusion plate serves as the second light exit surface of the light emitting component.

16. The double-sided liquid crystal display device according to claim 15, wherein the light source comprises a transparent circuit board; the transparent circuit board comprises a first surface and a second surface disposed opposite to each other; the first surface and the second surface are provided with a plurality of light emitting devices respectively.

* * * * *